(12) United States Patent
Cameron

(10) Patent No.: US 10,130,046 B1
(45) Date of Patent: Nov. 20, 2018

(54) COLLAPSIBLE PLANT DOME DEVICE

(71) Applicant: Ambermoon Cameron, North San Juan, CA (US)

(72) Inventor: Ambermoon Cameron, North San Juan, CA (US)

( * ) Notice: Subject to any disclaimer, the term of this patent is extended or adjusted under 35 U.S.C. 154(b) by 241 days.

(21) Appl. No.: 14/821,714

(22) Filed: Aug. 8, 2015

Related U.S. Application Data

(60) Provisional application No. 62/035,228, filed on Aug. 8, 2014.

(51) Int. Cl.
*A01G 13/02* (2006.01)

(52) U.S. Cl.
CPC .............................. *A01G 13/0206* (2013.01)

(58) Field of Classification Search
CPC .. A01G 13/043; A01G 13/02; A01G 13/0206; A01G 13/0212; A01G 9/16; E04H 15/28; E04H 15/32; E04H 15/44; E04H 15/46; E04H 15/62
USPC ........... 47/29.1, 29.2, 29.3, 29.5, 29.6, 29.7, 47/32.3, 23.1, 23.2, 24.1, 20.1, 31, 31.1; 135/33.7, 33.71, 15.1, 98, 99, 118, 119, 135/120.3, 120.4
See application file for complete search history.

(56) References Cited

U.S. PATENT DOCUMENTS

| | | | |
|---|---|---|---|
| 645,890 A | 3/1900 | Conrad | |
| 690,102 A | 12/1901 | Dummer, Jr. | |
| 1,349,281 A | 8/1920 | King | |
| 2,546,228 A * | 3/1951 | Martini | A45B 25/00 135/16 |
| 2,863,467 A * | 12/1958 | Hearell | E04H 15/003 135/114 |
| 2,864,389 A | 12/1958 | Smith et al. | |
| 3,874,397 A | 4/1975 | Oberhaus | |
| 3,889,698 A | 6/1975 | Roessl | |
| 3,913,598 A * | 10/1975 | Glutting, Jr. | E04H 1/1205 135/117 |
| 3,960,162 A | 6/1976 | Noel | |
| 4,304,068 A | 12/1981 | Bedder | |
| 4,327,520 A | 5/1982 | Saxby et al. | |
| 4,632,138 A * | 12/1986 | Irwin | E04H 15/001 135/143 |
| 5,871,026 A * | 2/1999 | Lin | E04H 15/28 135/120.3 |
| 5,894,855 A | 4/1999 | Gefell | |
| 6,776,177 B2 | 8/2004 | Wu | |

(Continued)

*Primary Examiner* — Trinh T Nguyen

(57) ABSTRACT

Collapsible plant dome device comprising a transparent canopy, a collapsible frame mounted on a central support member and comprising a plurality of support arms carrying the transparent canopy, a pair of diametrically opposed vent mesh openings disposed within a sidewall of the transparent canopy, a pair of diametrically opposed vent flaps each pivotally connected to a respective horizontal upper edge of each of the diametrically opposed vent mesh openings for covering and uncovering each of the diametrically opposed vent mesh openings in respective closed and open vent configurations, and at least one pair of tie down rings each interiorly mounted on a different one of a diametrically opposed pair of the plurality of support arms. In one embodiment, the device comprises a transparent skirt detachably coupled to an interior side of the transparent canopy for forming an imbricated transparent domed canopy and skirt plant enclosure.

20 Claims, 18 Drawing Sheets

(56) References Cited

U.S. PATENT DOCUMENTS

| | | | |
|---|---|---|---|
| D499,880 S * | 12/2004 | Wright | D3/5 |
| D596,527 S | 7/2009 | Kertz | |
| 7,793,674 B2 * | 9/2010 | Elder | A45B 11/00 135/16 |
| D642,701 S | 8/2011 | Howard | |
| D643,131 S | 8/2011 | Howard | |
| 8,079,176 B1 | 12/2011 | Thead et al. | |
| 2002/0134010 A1 | 9/2002 | Rohrborn, Jr. et al. | |
| 2006/0236621 A1 * | 10/2006 | Burns | E04H 15/62 52/155 |
| 2007/0089771 A1 * | 4/2007 | Jerry | A45B 19/04 135/98 |

* cited by examiner

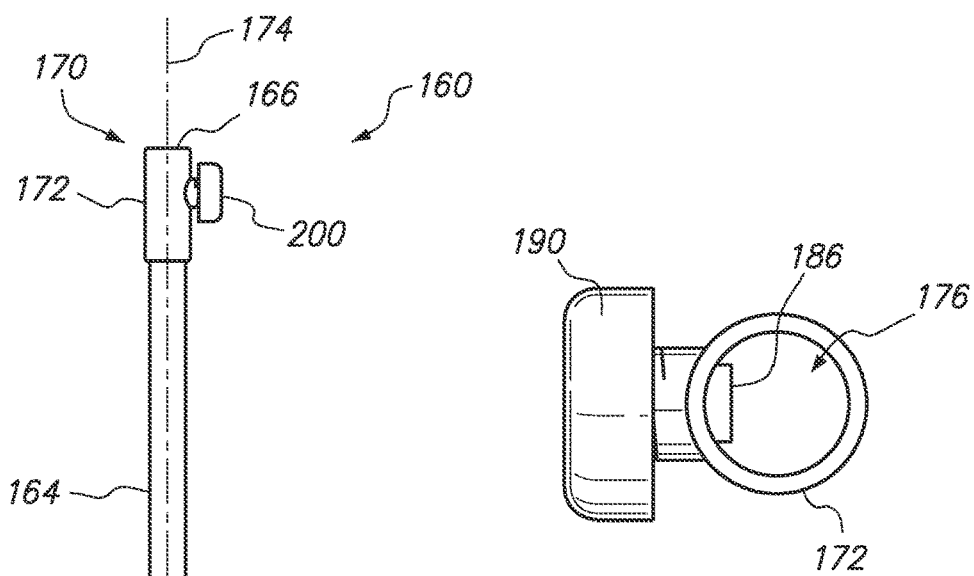
FIG. 14
FIG. 15
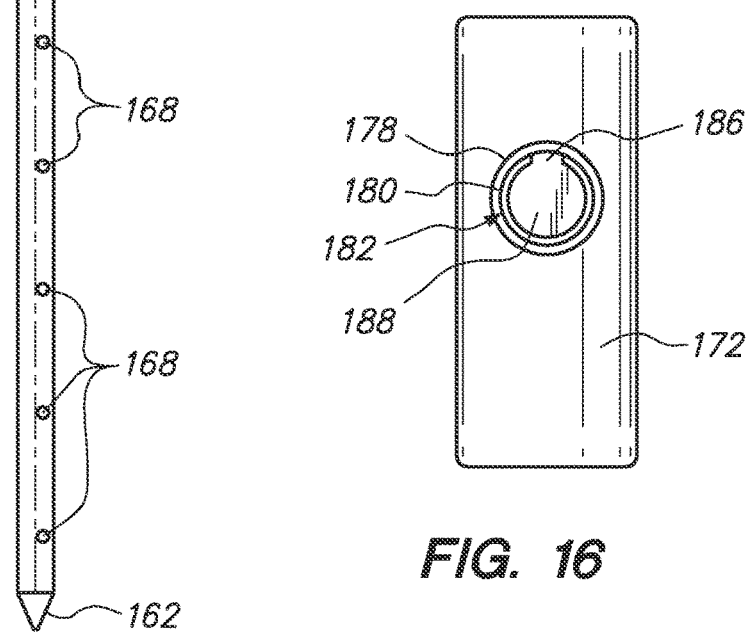
FIG. 16

COLLAPSIBLE PLANT DOME DEVICE

CROSS-REFERENCE TO RELATED APPLICATIONS

This application claims priority under 35 USC Section 119(e) to U.S. Provisional Patent Application No. 62/035,228, filed Aug. 8, 2014, the entire disclosure of which is incorporated herein by reference.

FIELD OF THE INVENTION

This invention relates generally to a protective plant cover and, in particular, to a collapsible portable plant dome device for protecting plants from the predations of the environment.

BACKGROUND OF THE INVENTION

It is well known that many plants are grown in conditions that require them to be protected from the predations of the environment including sheltering the plants for their proper growth and survival.

As a result, there are many known forms of protective plant covers, but yet each is problematic for one or more of the following reasons of being unreliable, bulky, heavy, expensive, and/or laborious and time consuming to assemble and erect as well to collapse, disassemble, and transport.

Accordingly, there is a need for a protective plant cover that, inter alia, overcomes one or more of the significant shortcomings of the known prior-art as delineated hereinabove.

BRIEF SUMMARY OF THE INVENTION

Accordingly, and in one aspect, an embodiment of the invention ameliorates or overcomes one or more of the significant shortcomings of the known prior art by providing a collapsible portable plant dome assembly for protecting plants from the predations of the environment.

More specifically, and in one aspect, an embodiment of the invention provides a collapsible plant dome device, the device comprising: a central support member comprising a cylindrical sidewall axially extending between a superior end and an inferior end; a transparent canopy formed of a transparent material enabling sunlight to pass therethrough; a collapsible frame assembly mounted on the central support member; the collapsible frame assembly comprising a first plurality of support arms carrying the transparent canopy; a pair of diametrically opposed vent openings formed of a mesh material disposed within a sidewall of the transparent canopy; a pair of diametrically opposed vent flaps each pivotally connected to a respective horizontal upper edge of each of the vent mesh openings for covering each of the vent mesh openings in a closed configuration and uncovering each of the vent mesh openings in an open configuration; and means for fastening each of the diametrically opposed vent flaps to the sidewall of the transparent canopy in the closed and open configurations.

In one embodiment, the collapsible plant dome device also comprises a first pair of tie down rings each interiorly mounted on a different one of a diametrically opposed pair of the first plurality of support arms carrying the transparent canopy.

In another embodiment, the collapsible plant dome device also comprises second pair of tie down rings each interiorly mounted on a different one of a second diametrically opposed pair of said first plurality of support arms carrying said canopy wherein an axis between said second diametrically opposed pair of tie down rings is generally perpendicular to an axis between said first diametrically opposed pair of tie down rings.

In another embodiment, the collapsible plant dome device also comprises a transparent skirt detachably coupled to an interior side of the transparent canopy for forming an imbricated transparent canopy over skirt coupling.

Accordingly, it should be apparent that numerous modifications and adaptations may be resorted to without departing from the scope and fair meaning of the claims as set forth herein below following the detailed description of the invention.

BRIEF DESCRIPTION OF THE DRAWINGS

FIG. 14 is a front perspective view of a medial extension member of an embodiment of the collapsible portable plant dome device comprising a clamping collar.

FIG. 15 is a top perspective view of the medial extension member of an embodiment of the collapsible portable plant dome device comprising the clamping collar.

FIG. 16 is a front perspective view of the clamping collar of an embodiment of the collapsible portable plant dome device.

DETAILED DESCRIPTION OF THE INVENTION

Figure 1:
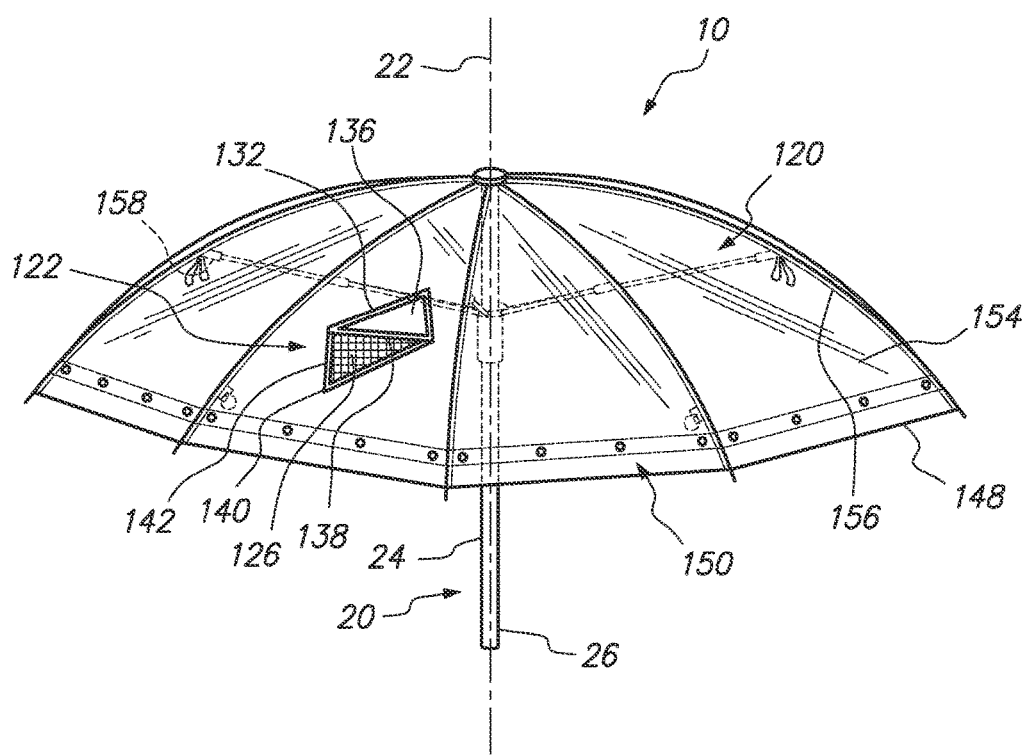
FIG. 1 is a perspective view of an embodiment of a collapsible portable plant dome device in an expanded position and comprising a central support member, a collapsible frame assembly, and a vented transparent canopy.

Considering the drawings, wherein like reference numerals denote like parts throughout the various drawing figures, reference numeral 10 is directed to an embodiment of a collapsible plant dome device for, inter alia, protecting plants from the predations of the environment.

Overview

Figure 2:
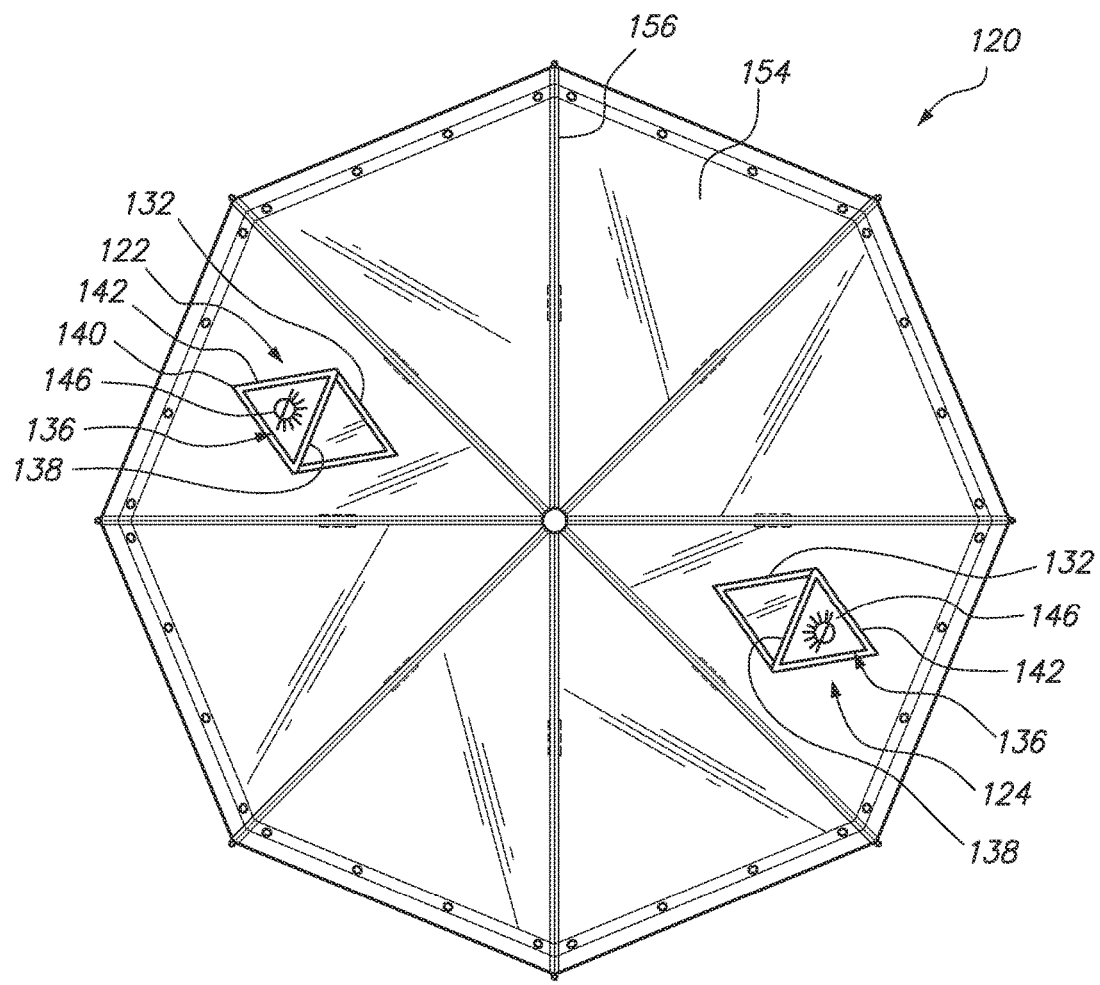
FIG. 2 is a top plan view of an embodiment of the collapsible portable plant dome device comprising a vented canopy having vents shown diametrically opposed and in a closed configuration.
Figure 3:
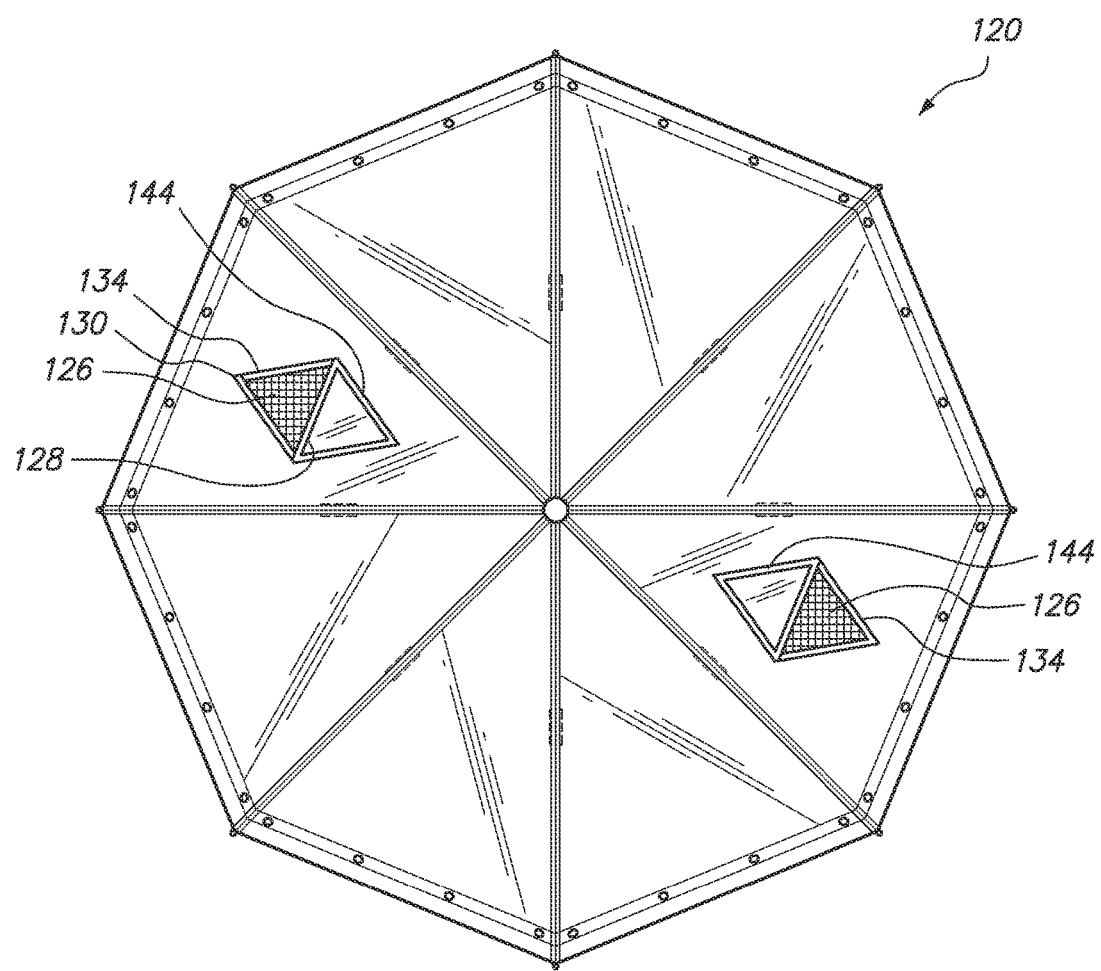
FIG. 3 is a top plan view of an embodiment of the collapsible portable plant dome device comprising the vented canopy having vents shown diametrically opposed and in an open configuration.

Referring to FIGS. 1 through 3, the collapsible plant dome device 10 comprises a central support member 20, a collapsible frame assembly 60 (FIG. 5) mounted on the central support member 20, and a transparent vented canopy 120 carried by the collapsible frame assembly 60. In one aspect, the transparent vented canopy 120 is formed from, but not limited to, a poly woven transparent material enabling sunlight to pass therethrough.

Additionally, an embodiment of the collapsible plant dome device 10 further comprises a medial extension member 160 (FIG. 14) configured to operatively couple to the central support member 20 via a clamping collar 170 for extending the height of the transparent vented canopy 120 relative to a surface below.

In turn, an embodiment of the collapsible plant dome device 10 further comprises a spike member assembly 200 (FIG. 18) having a spike member 202 with an inferior pointed end 212 for assisting with the insertion of the spike member 202 into the ground or soil below the transparent vented canopy 120 and a superior circumscribing open end 206 configured to telescopically receive the medial extension member 160.

Figure 4:
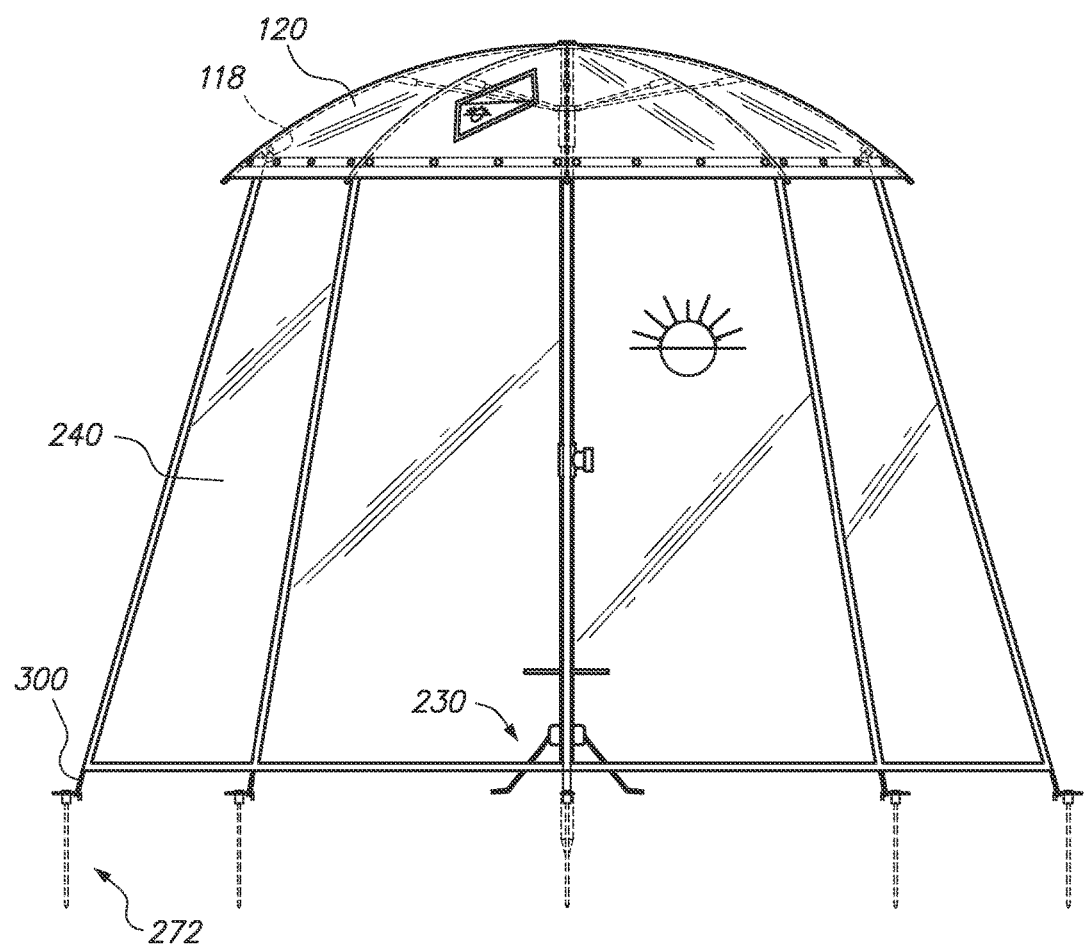
FIG. 4 is a perspective view of an embodiment of the collapsible portable plant dome device further comprising a circumscribing skirt.

Referring to FIG. 4, an embodiment of the collapsible plant dome device 10 further comprises a transparent skirt 240 having an upper interiorly imbricated coupling with the transparent vented canopy 120 and downwardly radially outwardly extending therefrom to the surface below.

An embodiment of the collapsible plant dome device 10 further comprises a tie down assembly 272 (FIG. 24) utilized for anchoring the collapsible frame assembly 60 carrying the transparent vented canopy 120 to the ground or surface below when used in combination with a plurality of interior tie down ring assemblies 112 (FIGS. 5 and 11) disposed on the collapsible frame assembly 60 interior to the transparent vented canopy 120 and a cord 300 (FIG. 26) tethered therebetween.

Moreover, an embodiment of the collapsible plant dome device 10 further comprises a tripod 230 configured to receive, depending on user configuration, the spike member 202, medial extension member 160, or central support member 20 for providing additional support respectively thereto.

In one embodiment, the legs 234 of the tripod 230 are telescopic for adjusting the height of coupling with the spike member 202 of the spike member assembly 200.

Figure 27:
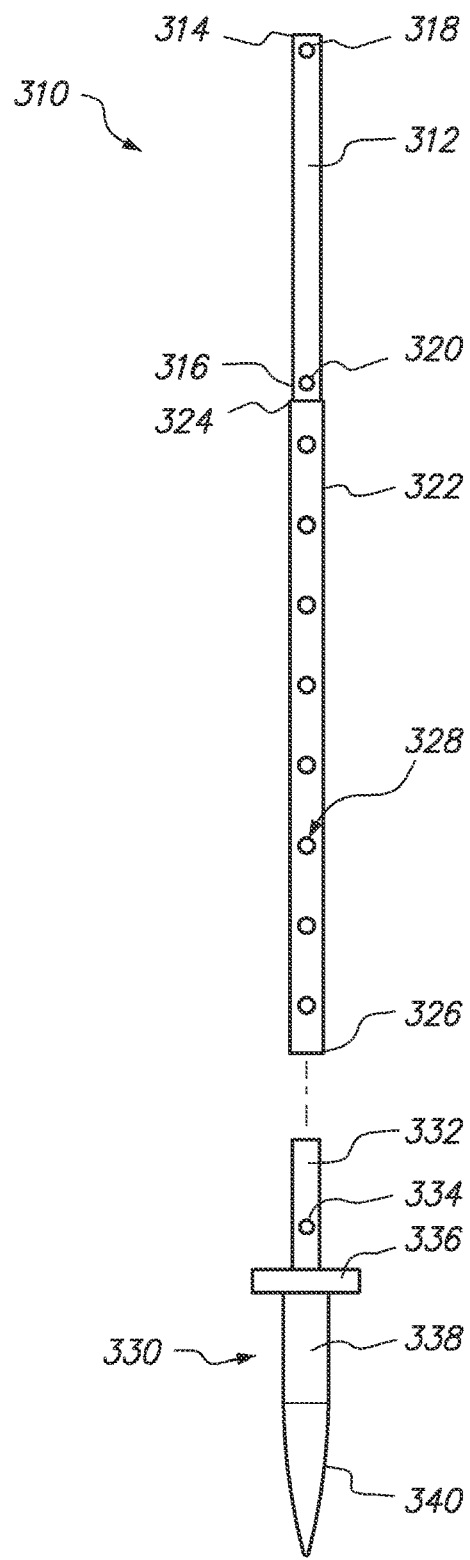
FIG. 27 is a side perspective view of a telescopic medial extension, an alternative embodiment of the medial extension and a spike for the telescopic medial extension, an alternative embodiment of the spike member.

In an alternate embodiment, the collapsible frame assembly 60 is surmounted on a central telescopic support member 310 (FIG. 27) having an inferior end provided with an integral spike member or configured to receive a spike member 320 (FIG. 27).

Central Support Member

Figure 5:
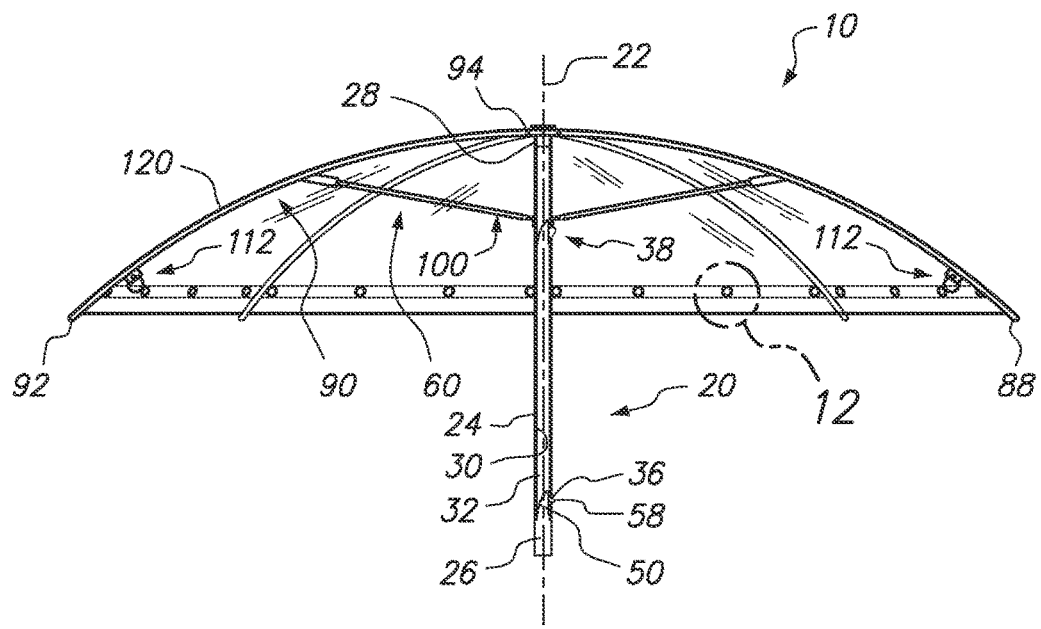
FIG. 5 is a side sectional partial view of an embodiment of the collapsible portable plant dome device.

More specifically, and referring to FIG. 5, the collapsible plant dome device 10 comprises the central support member 20 having a central longitudinal axis 22 and a cylindrical sidewall 24 axially extending between an inferior end 26 and a superior end 28.

The cylindrical sidewall 24 comprises a circumscribing interior surface 30 defining a bore 32 having an axis coincident with the central longitudinal axis 22 and extending through the central support member 20 between the inferior end 26 and superior end 28.

Catch Means

Referring to FIG. 5, the central support member 20 also comprises a catch means 38 that allows a collar 106 of a circumscribing carrier 96 (FIG. 10) to pass along the central support member 20 between a location below the catch means 38 in the first generally linearly collapsed position to a location above the catch means 38 in the second open radially expanded position.

First U-Shaped Spring

Figure 6:
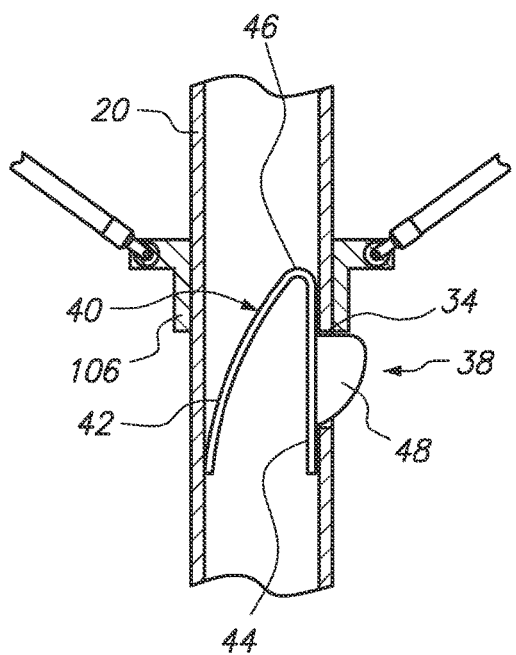
FIG. 6 is a side sectional view of a catch means of an embodiment of the collapsible portable plant dome device wherein the catch means as illustrated comprises an inverted U-shaped spring having a protrusion extending through a sidewall of the central support member.

Referring to FIGS. 5 and 6, and in one embodiment, catch means 38 comprises an inverted U-shaped spring 40 disposed in the central support member 20 proximate superior end 28.

As illustrated, the U-shaped spring 40 comprises a pair of spaced apart legs 42, 44 distally extending from an arcuate apex 46 wherein leg 44 has a protrusion 48 biased through a first opening 34 in the central support member 20.

In use and operation, the collar 106 of a circumscribing carrier 96 is captured above the protrusion 48 when the canopy 120 is in the second open radially expanded position and, with a one button release via button 98, allows the circumscribing carrier 96 to pass along the central support member 20 to a location below the catch means 38 to dispose the transparent vented canopy 120 to the first generally linearly collapsed position.

Second U-Shaped Spring

Figure 7:
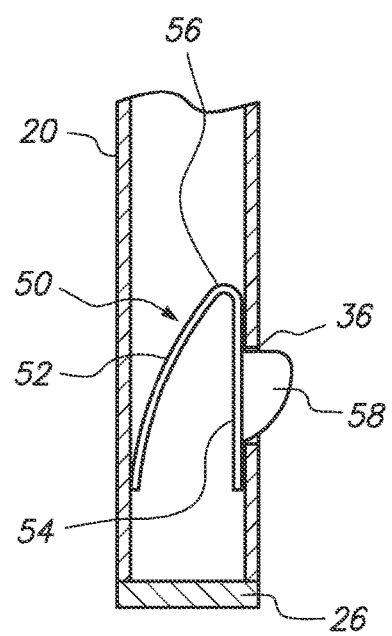
FIG. 7 is a side sectional view of a second inverted U-shaped spring of an embodiment of the collapsible portable plant dome device wherein the second inverted U-shaped spring comprises a protrusion extending through the sidewall of the central support member proximate an inferior end thereof.

Referring to FIG. 7, the central support member 20 further comprises a second inverted U-shaped spring 50 disposed in the central support member 20 proximate the inferior end 26 thereof. As illustrated, the second U-shaped spring 50 comprises a pair of spaced apart legs 52, 54 distally extending from an arcuate apex 56 wherein leg 54 has a protrusion 58 biased through a second opening 36 in the central support member 20 proximate the inferior end 26 and retractable into the central support member 20. In use and operation, the protrusion 58 biases into a medial sidewall opening 180 (FIG. 16) for coupling thereto and, with a one button release via button 98, allows decoupling therefrom.

Collapsible Frame Assembly

Upper Insert

Figure 8:
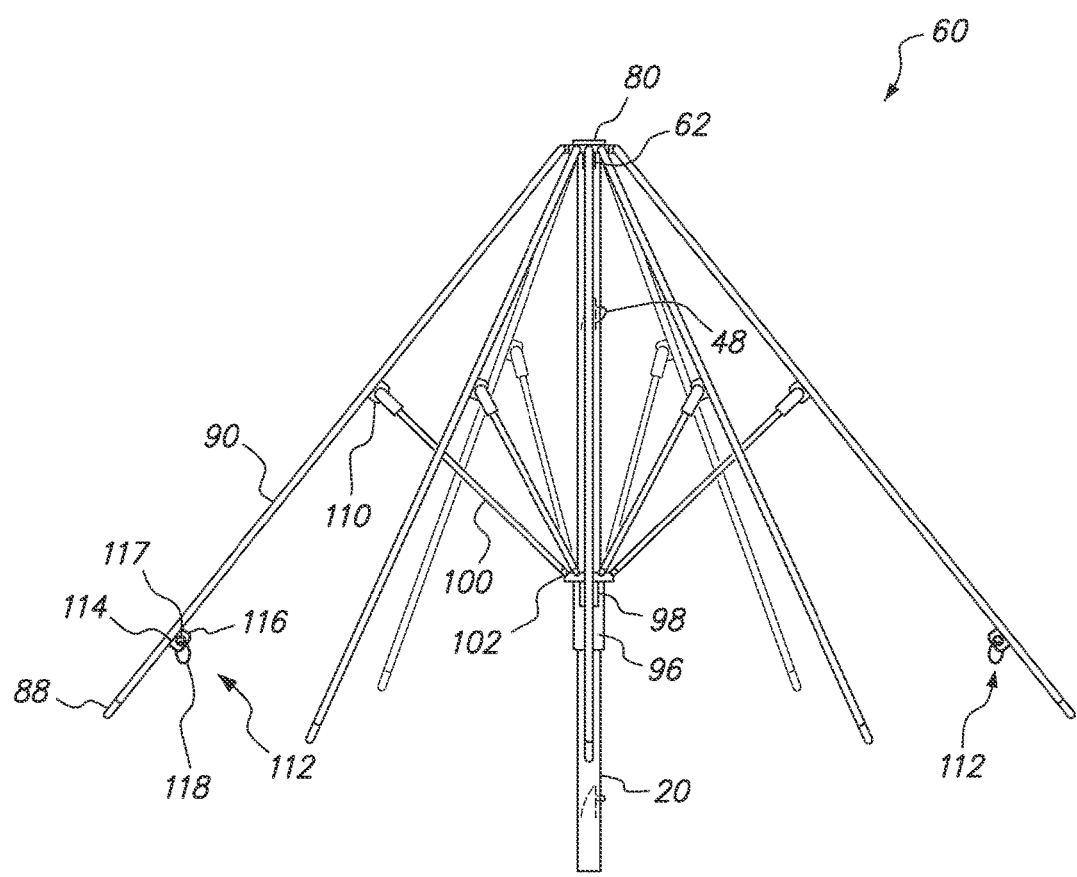
FIG. 8 is a partial side sectional view of an embodiment of the collapsible portable plant dome device in a partially expanded/collapsed position.
Figure 9:
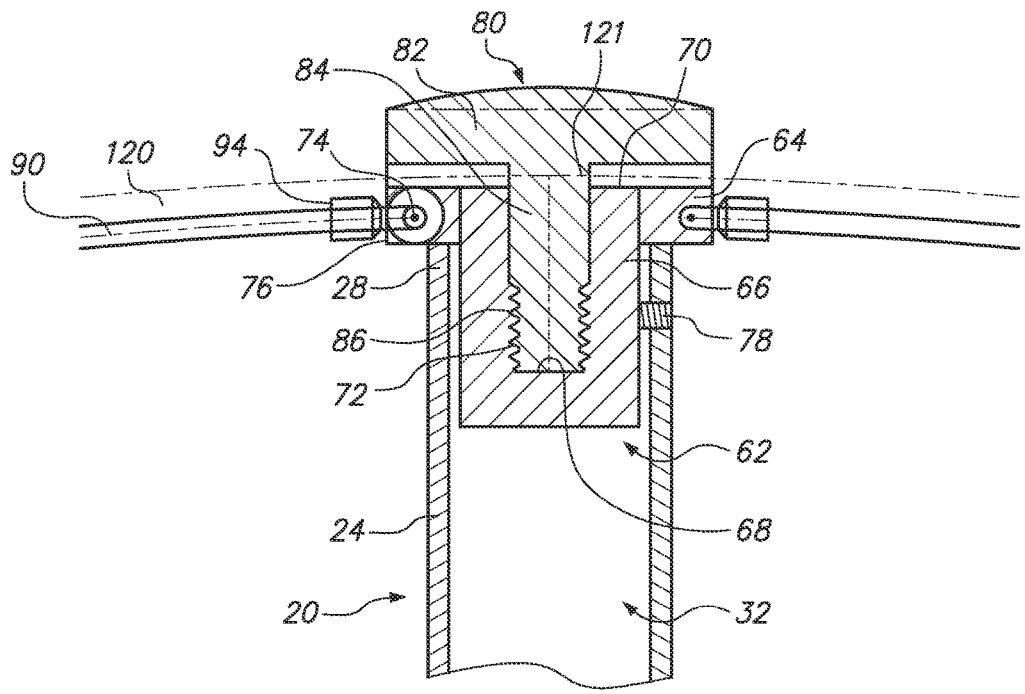
FIG. 9 is a sectional view of an insert and cap assembly of an embodiment of the collapsible portable plant dome device.

Referring to FIGS. 8 and 9, and as noted above, the collapsible plant dome device 10 comprises collapsible frame assembly 60 mounted on the central support member 20. In one embodiment, the collapsible frame assembly 60 comprises an upper insert 62 comprising a superior collar 64 surmounting a body 66. The body 66 is configured to be received within the superior end 28 of the bore 32 of the central support member 20 with the superior collar 64 surmounting and radially extending away from the superior end 28 of the central support member 20.

Additionally, the upper insert 62 comprises a circumscribing interior surface 68 defining a blind bore disposed through a superior face 70 of the insert 62 wherein the circumscribing interior surface 68 comprises an interiorly threaded distal portion 72.

Furthermore, superior collar 64 comprises a recessed ring 74 and a plurality of journal mounting slots 76 that provide pivotal coupling access to the recessed ring 74 for the first plurality of support arms 90 pivotally coupled to recessed ring 74.

Screw 78 passes through the cylindrical sidewall 24 of the central support member 20 for securing the insert 62 into the central support member 20 at superior end 28 thereof.

T-Shaped Cap

The collapsible frame assembly 60 further comprises a T-shaped cap 80 comprising a disc shaped head 82 surmounting a superior end of a shaft 84 having a distal exteriorly threaded portion 86 configured to be received within the blind bore of the insert 62 and threadedly coupled to the interiorly threaded distal portion 72 wherein the shaft 84 passes through a apex opening 121 in the transparent canopy 120 and captures a portion of the canopy 120 circumscribing the apex opening between an underside of the disc shaped head 82 and a superior face 70 of the insert 62 wherein the disc shaped head 82 is of a greater diameter than the apex opening 121 for precluding passage of the disc shaped head 82 therethrough. In one embodiment the disc shaped head 82 has a convex shaped top face.

First Plurality of Support Arms

Still referring to FIGS. 8 and 9, the collapsible frame assembly 60 comprises the first plurality of support arms 90 carrying the transparent vented canopy 120. The first plurality of support arms 90 comprises circumferentially spaced apart free distal ends 92 (FIGS. 5 and 11) and circumferentially spaced apart proximal journal ends 94 pivotally coupled to ring 74 recessed into and circumscribing the superior collar 64 wherein collar 64 comprises a plurality of journal mounting slots 76 providing pivotally coupling access for each of the journal ends 94 to the recessed ring 74.

Circumscribing Carrier

Figure 10:
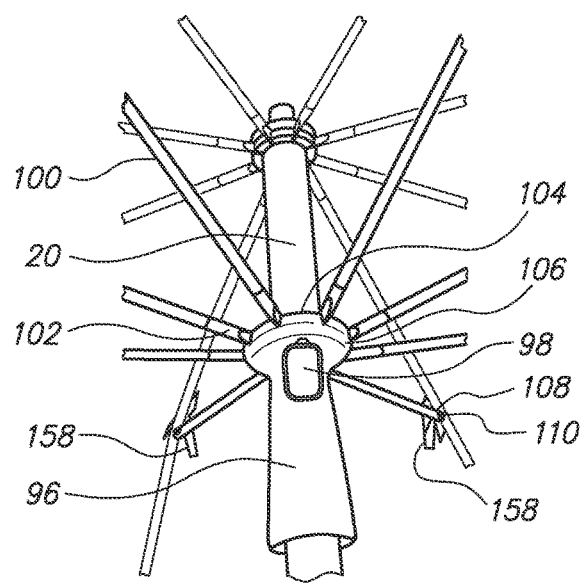
FIG. 10 is a partial perspective view of an underside of an embodiment of the collapsible portable plant dome device.

Referring to FIG. 10, and as noted above, the collapsible frame assembly 60 comprises circumscribing carrier 96 movably disposed along the central support member 20 between the open frame position and the collapsed frame position. In both the open and collapsed frame configurations, the circumscribing carrier 96 is located below the superior collar 64 of the upper insert 62. Additionally, the circumscribing carrier 96 comprises a push button 98 for disengaging the catch means 38 for releasing hold of the circumscribing carrier 96 previously captured in the open frame position.

Second Plurality of Support Arms Support Arms

Referring FIGS. 8 and 10, the collapsible frame assembly 60 comprises a second plurality of support arms 100 having circumferentially spaced apart proximal journal ends 102 pivotally coupled to a ring 104 recessed into and circumscribing the superior collar 106 wherein collar 106 comprises a plurality of journal mounting slots providing pivotally coupling access for each of the proximal journal ends 102 to the recessed ring 104.

In turn, the second plurality of support arms 100 further comprises circumferentially spaced apart distal ends 108 pivotally coupled between the circumferentially spaced apart free distal ends 92 and proximal ends 94 of the first plurality of support arms 90 with a pivotal journal coupling 110 for articulating the first plurality of support arms 90 carrying the transparent vented canopy 120 from the first generally linearly collapsed position with the carrier 96 disposed in the closed frame position to the second open radially expanded position with the carrier 96 disposed in the open frame position for presenting the transparent vented canopy 120 into a generally domed shaped configuration circumferentially traversing or spanning the central support member 20.

In one embodiment, the first plurality of support arms 90 and the second plurality of support arms 100 are formed from, but not limited to, a flexible fiberglass material.

Distal End Caps

Figure 11:
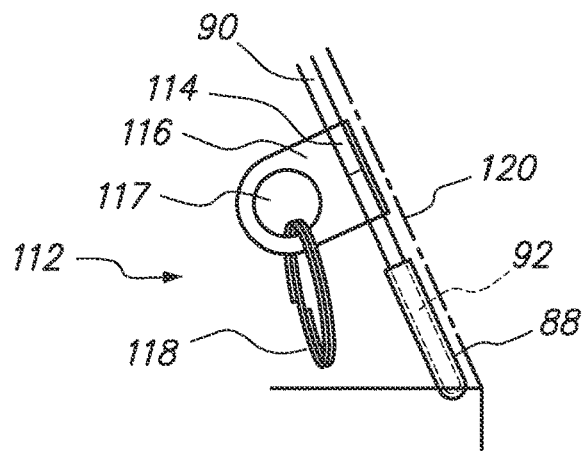
FIG. 11 is a side elevation view of an interior tie down ring assembly of an embodiment of the collapsible portable plant dome device.

Referring now to FIG. 11, each of the free distal ends 92 of each of the first plurality of support arms 90 is fitted with a distal end cap 88 that removeably captures and secures the transparent vented canopy 120 to the free distal ends 92.

Tie Down Ring Assembly

Additionally, and still referring to FIG. 11, the collapsible frame assembly 60 further comprises a plurality of tie down ring assemblies 112 each interiorly mounted on a different one of a diametrically opposed pair of the first plurality of support arms 90 carrying the transparent vented canopy 120.

Each tie down ring assembly 112 comprises an elongated fitting body 114 wrapped about the respective one of the first plurality of support arms 90 and a pair of substantially flat lugs 116 extending from mutually opposite sides of the elongated body 114 radially inwardly toward the central longitudinal axis 22 of the support member 20 wherein the flat lugs 116 have opposed openings 117 having a common axis therethrough so that a respective tie down ring 118 can be received through and pivot about.

In one embodiment, the collapsible frame assembly 60 comprises a first pair of tie down ring assemblies 112 each interiorly mounted on a different one of a first diametrically opposed pair of the first plurality of support arms carrying the transparent vented canopy 120. Additionally, an embodiment of the collapsible frame assembly 60 comprises a second pair of tie down ring assemblies 112 each interiorly mounted on a different one of a second diametrically opposed pair of the first plurality of support arms carrying the transparent vented canopy 120 wherein an axis between the first diametrically opposed pair of tie down ring assemblies 112 is generally perpendicular to an axis between the second diametrically opposed pair of tie down ring assemblies 112.

Transparent Vented Canopy

Referring back to FIGS. 1 through 4, and as noted above, the transparent vented canopy 120 is carried by the collapsible frame assembly 60 having a closed frame generally linearly collapsed canopy position and open frame radially expanded canopy position for presenting the transparent vented canopy 120 into a generally domed shaped configuration circumferentially spanning the central support member 20.

In one embodiment, and referring to FIGS. 2 and 3, the transparent vented canopy 120 comprises a pair of diametrically opposed triangular vent assemblies 122, 124 each respectively comprising a triangular shaped mesh vent opening 126 (FIG. 3) disposed within a sidewall of the transparent vented canopy 120. The mesh vent opening 126 comprises a horizontal upper edge 128 and side edges converging to a lower tip 130.

Each of the triangular vent assemblies 122, 124 further comprises a diamond shaped fastening strip comprised of an upper inverted V-shaped fastening strip 132 (FIG. 2) and a lower V-shaped fastening strip 134 (FIG. 3) bordering the side edges of the triangular shaped mesh vent opening 126.

Additionally, each of the triangular vent assemblies 122, 124 further comprises a triangular shaped nylon stitch vent flap 136 comprising an interior surface, an exterior surface, and a horizontal edge 138 transitioning to side edges converging to a tip 140 wherein horizontal edge 138 of vent flap 136 is pivotally connected to the horizontal upper edge 128 of vent mesh opening 126 for covering the vent mesh opening 126 in a closed configuration and uncovering the vent mesh opening 126 in an open configuration.

In one embodiment, each triangular shaped nylon stitch vent flap 136 further comprises an exterior V-shaped side fastening strip 142 and an interior V-shaped fastening strip 144. The exterior V-shaped side fastening strip 142 is disposed on the exterior surface of the triangular shaped nylon stitch vent flap 136 proximate the side edges thereof and, likewise, the interior V-shaped fastening strip 144 is disposed on the interior surface of the triangular shaped nylon stitch vent flap 136 at a location bordering the side edges thereof.

Accordingly, the interior V-shaped fastening strip 144 forms a releasable/disengageable hook and loop coupling with the lower V-shaped fastening strip 134 in a closed vent position and the exterior V-shaped fastening strip 142 forms a releasable/disengageable hook and loop coupling with the upper inverted V-shaped fastening strip 132 in an open vent position.

Additionally, and in one embodiment, the exterior surface of the triangular shaped nylon stitch vent flap 136 comprises an indicia/logo 146 disposed thereon.

Lower Reinforced Circumscribing Strip

Now referring again to FIG. 1, the canopy 120 comprises a lower reinforced circumscribing strip 148 having an array of spaced apart first snap button portions 150 disposed along an entire length of the lower reinforced circumscribing strip 148.

Referring to FIG. 4, and when coupled together, the transparent vented canopy 120 forms an imbricated overlying coupling with the transparent skirt 240 via an array of spaced apart second snap button portions 256 (FIG. 21) disposed on an upper circular reinforced strip 248 of the skirt 240.

Snap Buttons

Figure 12:
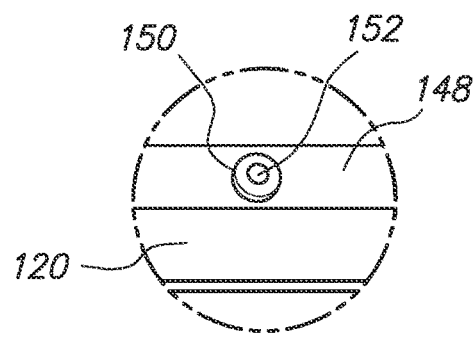
FIG. 12 is a top plan view of a fragmented portion of the canopy of an embodiment of the collapsible portable plant dome device comprising a first snap button portion disposed through a lower reinforced circumscribing strip.
Figure 13:
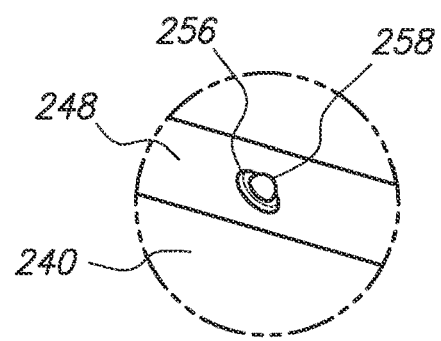
FIG. 13 is a top plan view of a fragmented portion of the transparent skirt of an embodiment of the collapsible portable plant dome device comprising a second snap button portion disposed through an uppermost circular reinforcement edge.

Referring now to FIGS. 12 and 13, each of the spaced apart first snap button portions 150 comprises a snap button receiving end 152 disposed on an interior of the lower reinforced circumscribing strip 148 for respectively coupling with a protrusion end 258 of each of the spaced apart second snap button portions 256 disposed on an exterior of the uppermost circular edge 248 of the transparent skirt 240 for providing an overlapping coupling of the receiving ends 152 of the circular array of the first snap button portions 150 with the protrusion ends 258 of the circular array of spaced apart second snap button portions 256 for forming the imbricated coupling of the transparent vented canopy 120 with the transparent skirt 240.

Eight Sectors

Referring to FIGS. 2 and 3, and in one embodiment, the canopy 120 comprises eight sectors 154 having radially extending reinforcement strips 156 between adjacent sectors wherein each of the eight sectors 154 of the canopy 120 comprises a portion of the lower reinforced circumscribing strip 148 comprising four of the spaced apart first snap button portions 150 each with the receiving end 152 interiorly disposed on the lower reinforced circumscribing strip 148.

In one embodiment, the radially extending reinforcement strips 156 are formed by, but not limited to, nylon stitch weld reinforcement strips.

Canopy Tie Down Laces

Referring to FIGS. 1 and 2, an embodiment of the transparent vented canopy 120 further comprises a plurality of interior canopy tie down laces 158 disposed on an interior of each of the nylon stitch weld reinforcement strips 156 for tying the transparent vented canopy 120 to the collapsible frame assembly 60.

Medial Extension Member

Referring to FIGS. 14 through 17, and as noted above, an embodiment of the collapsible plant dome device 10 comprises the medial extension member 160 configured to operatively couple to the central support member 20 via a clamping collar 170 of medial extension member 160 for extending the height of the transparent vented canopy 120 relative to a surface below.

In particular, and referring to FIG. 12, the medial extension member 160 comprises a conically shaped inferior tip 162 superiorly transitioning into a cylindrical sidewall 164 axially extending to an open superior circumscribing end 166 integrally formed with the clamping collar 170 for defining an open top end 166 of the medial extension member 160.

The cylindrical sidewall 164 of the medial extension member 160 comprises a plurality of longitudinally spaced apart pairs of opposed apertures 168 disposed through opposing sections of the cylindrical sidewall 164 starting proximate the conically shaped inferior tip 162 and superiorly spaced therefrom.

In turn, the clamping collar 170 comprises a cylindrical sidewall 172 having a central longitudinal axis 174 coincident with the central longitudinal axis of the cylindrical sidewall 164. The cylindrical sidewall 172 comprises an interior circumscribing surface that defines an elongated passageway 176 extending along the central longitudinal axis 174.

Additionally, the clamping collar 170 comprises an abbreviated cylindrical sidewall 178 integrally formed with the cylindrical sidewall 172 at a location circumscribing a medial sidewall opening 180 disposed at a medial location in sidewall 172 so as to have a central axis generally perpendicular with the central longitudinal axis 174 of sidewall 172.

The abbreviated cylindrical sidewall 178 comprises an interior circumscribing surface defining an access passageway 182 in open communication with the elongated passageway 176 via the medial sidewall opening 180 wherein the elongated passageway 176 is configured to allow the central support member 20 to pass into the clamping collar 170 for causing the lower protrusion 58 to be retracted into the central support member 20 and biased back out through the medial sidewall opening 180. The abbreviated cylindrical sidewall 178 also has an externally threaded surface portion 184 as further detailed below.

Furthermore, the clamping collar 170 comprises a cantilever projection 186 pivotally disposed generally at the intersection of the elongated passageway 176 and the access passageway 182. In particular, the cantilever projection 186 is pivotally connected to the cylindrical sidewall 172 of the clamping collar 170 adjacent the medial sidewall opening 180 and projects generally parallel over medial sidewall opening 180 for locating a face 188 of the cantilever projection 186 over the protrusion 58 of the central support member 20.

In one embodiment, the central support member 20 and the medial extension member 160 are formed from, but not limited to, an aluminum material.

Cap

Figure 17:
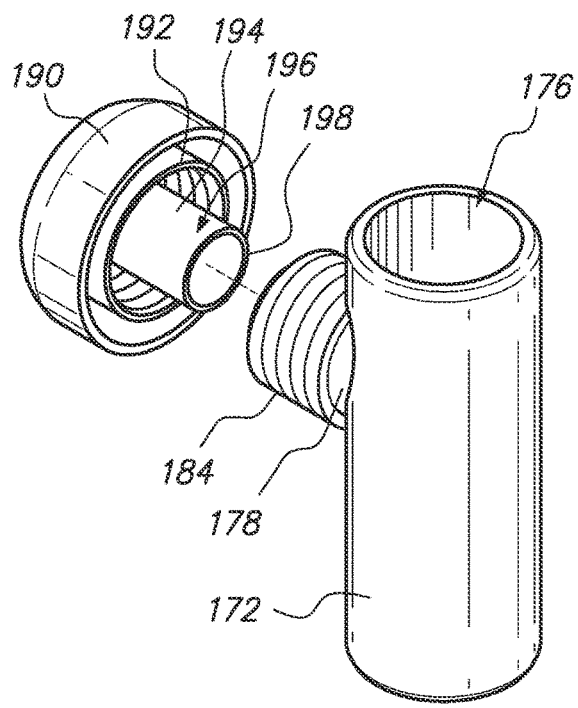
FIG. 17 is a partial exploded parts view of the clamping collar of an embodiment of the collapsible portable plant dome device.

Referring to FIGS. 14 and 17, the medial extension member 160 further comprises a cap 190 having an internally threaded annular rim 192 circumscribing a proximate end 194 of a hollow cylindrical shaft 196 that terminates to a substantially flat open distal end 198. The hollow cylindrical shaft 196 is sized to be received within the access passageway 182 with the internally threaded annular rim 192 threadedly coupling to the externally threaded surface portion 184 of the abbreviated cylindrical sidewall 178. This threaded coupling allows the shaft 196 to be advanced through the access passageway 182 and place the substantially flat open distal end 198 of the hollow cylindrical shaft into abutment against the pivotally connected cantilever projection 186 causing pivoting of the cantilever projection 186 against the central support member 20 while precluding actuation of the protrusion 58 wherein the substantially flat open distal end 198 of the hollow cylindrical shaft 196 abuts at least partially against the central support member 20 for providing a clamping action between the medial extension member 160 and central support member 20. Removal of the cap 190 allows access to press the protrusion 58 back into central support member 20 to release the medial extension member 160 from the central support member 20.

Spike Member Assembly

Figure 18:
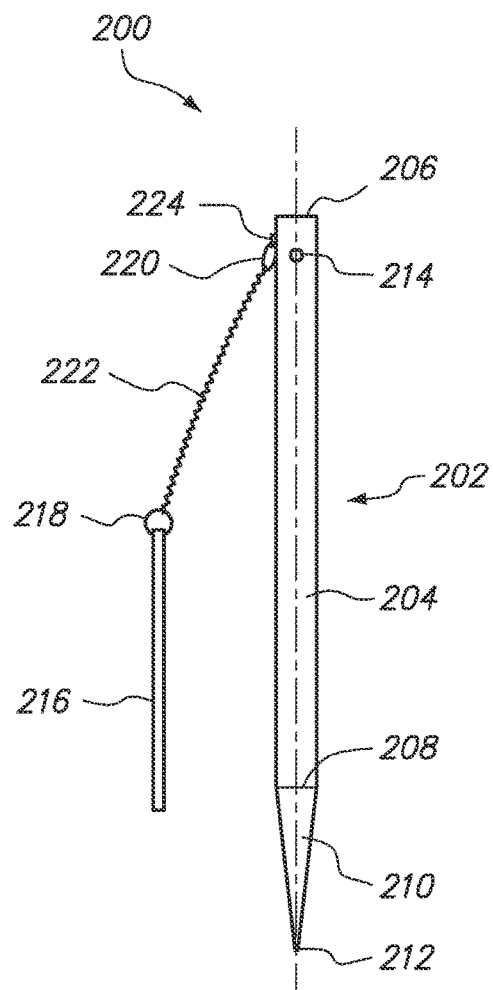
FIG. 18 is a front perspective view of a spike member assembly of an embodiment of the collapsible portable plant dome device.

Referring to FIG. 18, and as noted above, an embodiment of the collapsible plant dome device 10 further comprises a spike member assembly 200. Spike member assembly 200 comprises a spike member 202 comprised of a cylindrical sidewall 204 axially extending between a superior circumscribing open end 206 and an inferior end 208 transitioning into a conical sidewall 210 terminating to an inferior tip end 212 for assisting with the insertion of the spike member 202 into the ground or soil below the transparent vented canopy 120.

In one embodiment, the cylindrical sidewall 204 of the spike member 202 comprises a pair of opposed spike member apertures 214 disposed through opposing sections of the cylindrical sidewall 204 proximate the superior circumscribing open end 206.

Figure 19:
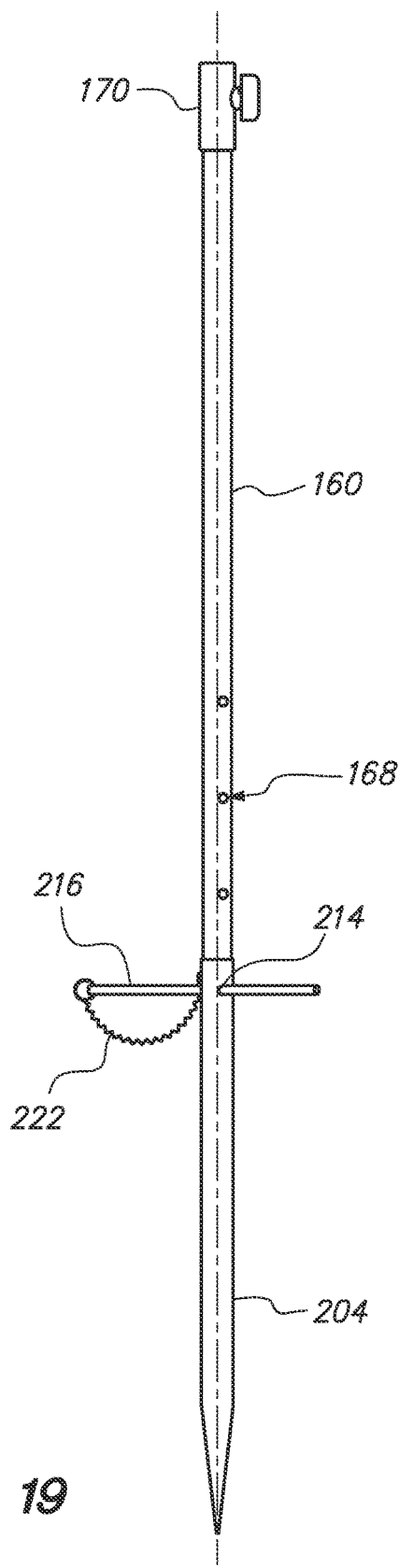
FIG. 19 is a perspective view of the medial extension member received within a spike member of the spike member assembly and telescopically adjusted and pined to a stationary position relative to the spike member.

Referring to FIGS. 18 and 19, the pair of opposed spike member apertures 214 is configured to align with one of the plurality of longitudinally spaced apart pairs of opposed apertures 168 disposed through the cylindrical sidewall 164 of the medial extension member 160 starting proximate the conically shaped inferior tip 162 and superiorly spaced therefrom. Once the user selected apertures 168 are aligned with apertures 214, an elongated spike pin 216 of the spike member assembly 200 is passed therethrough. In one embodiment, the elongated spike pin 216 is tethered to the spike member 202 via end loops 218, 220 attached to interposing chain 222. In particular, end loop 218 is attached to spike pin 216 and, at an opposing end, loop 220 is attached to an integral eye 224 formed in the cylindrical sidewall 204 of the spike member 202 adjacent the open end 206 thereof. Preferably, the chain 218 is sized to have at least a length that allows elongated spike pin 216 to be inserted through the spike member apertures 214 and an aligned pair of the plurality of longitudinally spaced apart pairs of opposed apertures 168 disposed through the cylindrical sidewall 164 of the medial extension member 160.

Tripod

Figure 20:
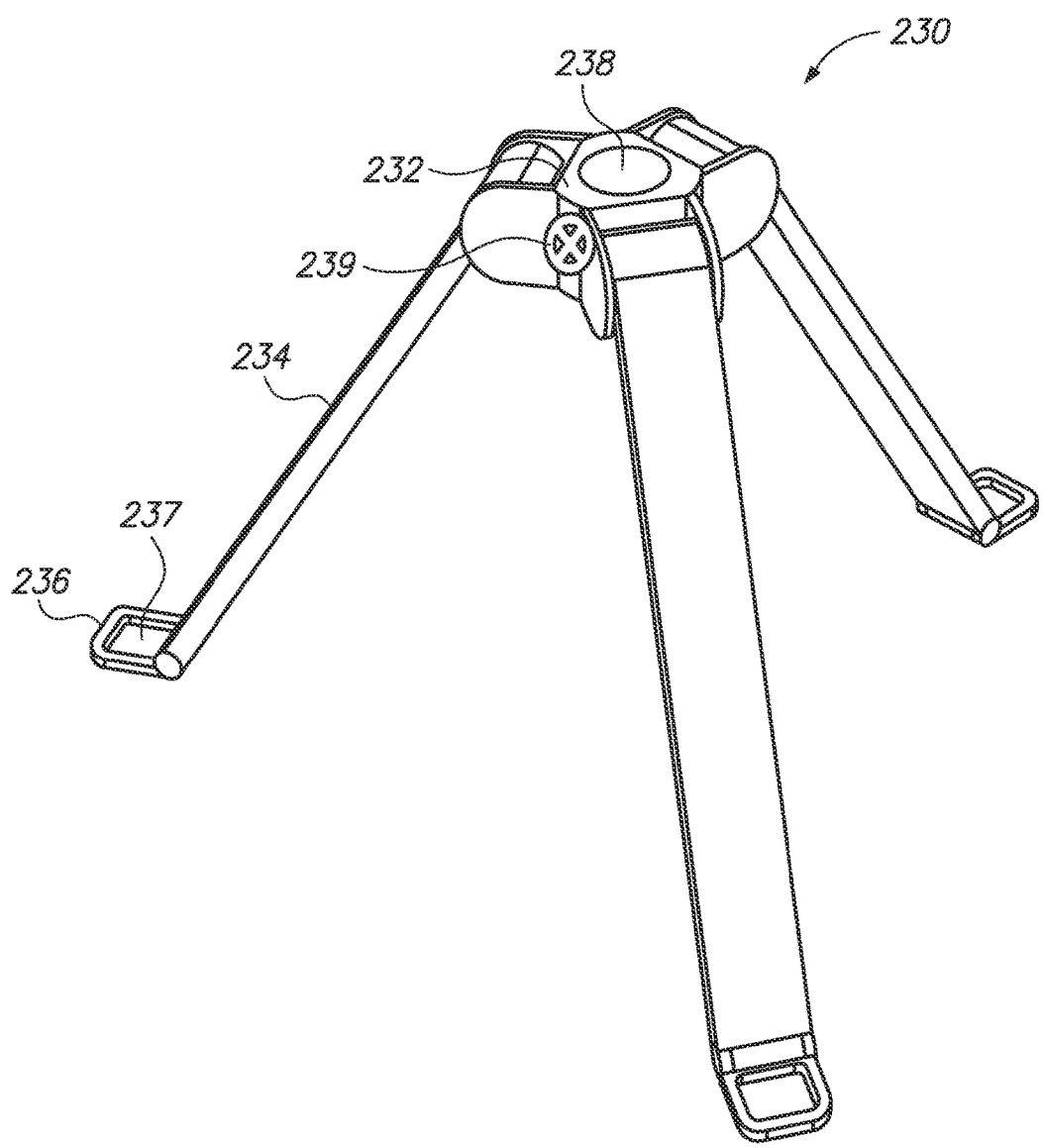
FIG. 20 is a perspective view of a tripod of an embodiment of the collapsible portable plant dome device.

Referring to FIG. 20, and as noted above, the collapsible plant dome device 10 further comprises tripod 230. Tripod 230 comprises a collar 232 and three spaced apart legs 234 each having a proximal end attached to the collar 232 and downwardly and outwardly extending therefrom wherein each of the three spaced apart legs 234 terminates to foot 236 having an aperture 237 for receiving a stake and capturing the respective foot 236 of each of the three spaced apart legs 234. Additionally, the collar 232 has a central aperture 238 configured to receive the spike 204, medial extension member 160, or central support member 20, depending upon user desired configuration, therethrough for providing support of the collapsible plant dome device 10. A set screw 239 may also be provided for providing a direct locking means between the tripod and spike 204, medial extension member 160, or central support member 20 depending upon user desired configuration.

Transparent Skirt

Referring again to FIG. 4, and as noted above, an embodiment of the collapsible plant dome device 10 further comprises the transparent skirt 240 removeably coupled and imbricated interiorly to the transparent vented canopy 120 and downwardly radially outwardly extending therefrom to the surface below.

Figure 21:
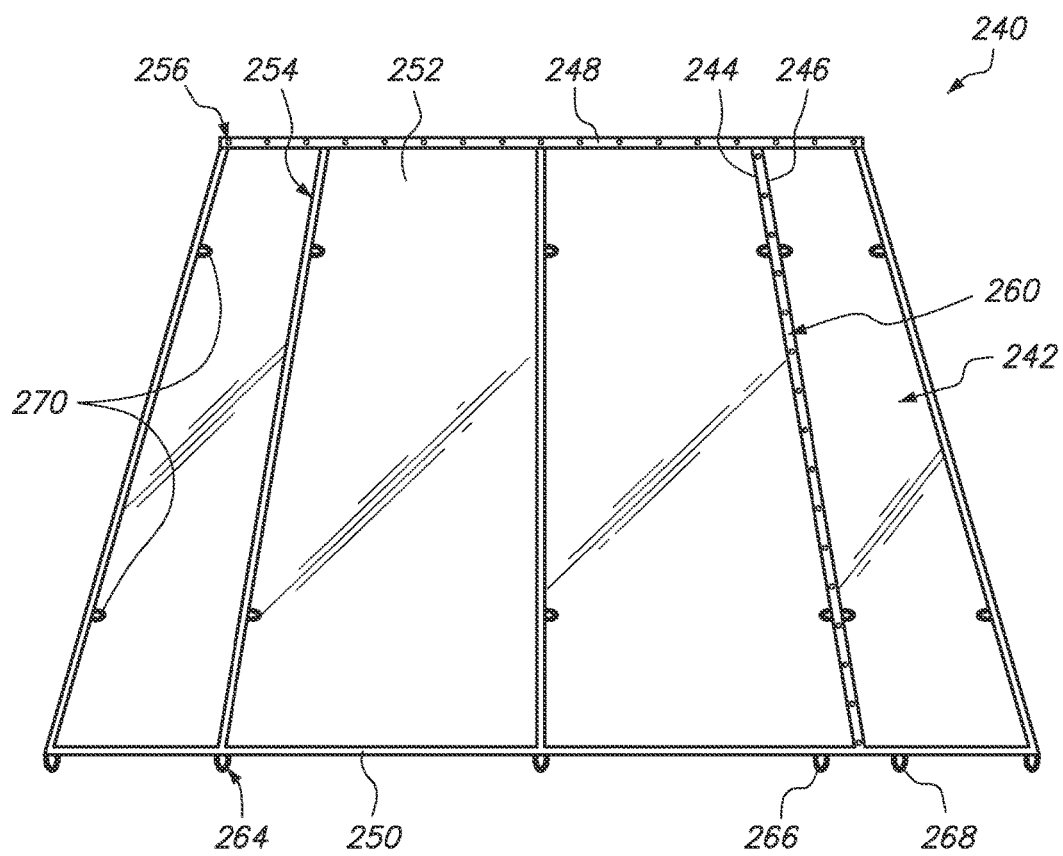
FIG. 21 is a side elevation view of the transparent skirt of an embodiment of the collapsible portable plant dome device.

More specifically, and referring to FIG. 21, an embodiment of the transparent skirt 240 comprises a skirt body 242 extending between first and second terminal ends 244, 246. The skirt body 242 is formed of, but not limited to, a poly woven transparent material enabling sunlight to pass therethrough. Additionally, the skirt body 242 comprises an uppermost circular reinforcement edge 248 and a lowermost circular reinforcement edge 250 of greater diameter than a diameter of the uppermost circular edge 248.

Figure 22:
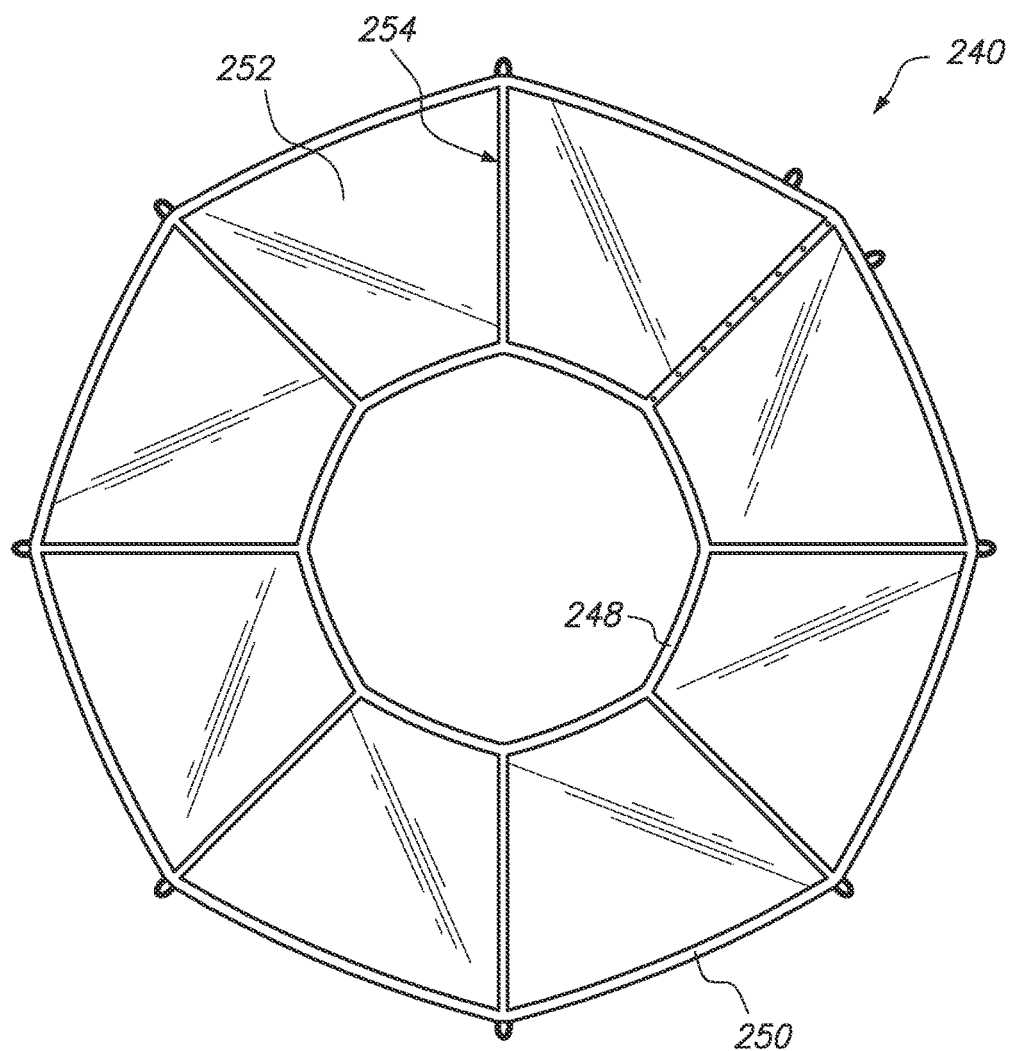
FIG. 22 is a top elevation view of the transparent skirt of an embodiment of the collapsible portable plant dome device with the skirt being in a closed configuration.

Referring to FIGS. 21 and 22, the body 242 of the skirt 240 is formed from a series of eight trapezoidal shaped sectors 252 extending between the first and second terminal ends 244, 246 of the body 242 of the skirt 240. Each of the trapezoidal shaped sectors 252 comprises an upper arcuate edge, a lower arcuate edge, and a pair of terminating sides. In addition, the body 242 further comprises a plurality of radially extending reinforcement ribs 254 wherein a different one of the ribs 254 is disposed at each intersection between terminating sides of adjacent trapezoidal shaped sectors 252.

Additionally, an embodiment of the transparent skirt 240 comprises an array of spaced apart second snap button portions 256 (FIG. 13) each with a protrusion end 258 disposed on an exterior of the uppermost circular reinforcement edge 248 of the skirt 240 for providing an overlapping interior coupling of the receiving ends 152 (FIG. 12) of the array of the first snap button portions 150 with the protrusion ends 258 (FIG. 13) of the array of spaced apart second snap button portions 256 for forming an imbricated coupling with the transparent vented canopy 120 overlapping the transparent skirt 240.

Figure 23:
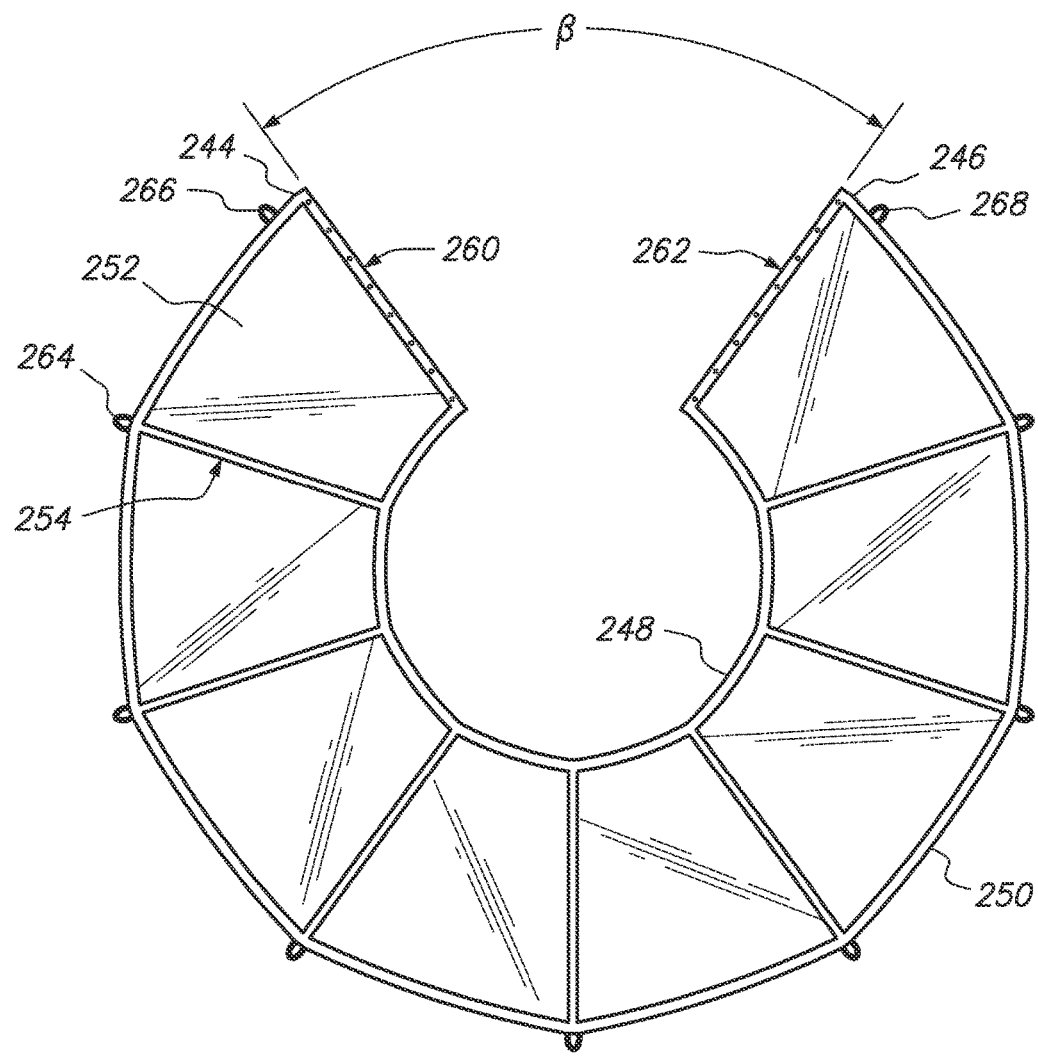
FIG. 23 is a top elevation view of the transparent skirt open and placed flat on a horizontal surface with an open sector between terminal ends of the transparent skirt spanning an angle beta.

Referring to FIG. 23, an embodiment of the transparent skirt 240 comprises an array of spaced apart third snap button portions 260, similar to snap button portion 150 (FIG. 12), each with a receiving end disposed on an interior of the first terminal end 244 of the transparent skirt 240. The transparent skirt 240 also comprises an array of spaced apart fourth snap button portions 262, similar to snap button portion 256 (FIG. 13), each with a protrusion end disposed on an exterior of the second terminal end 246 of the skirt 240 for providing an overlapping coupling of the receiving ends of the array of the third snap button portions 260 with the protrusion ends of the array of the fourth snap button portions 262.

Moreover, an embodiment of the transparent skirt 240 comprises a plurality of radially extending tie down tabs 264 comprising and anchor eyelet wherein a different one of the plurality of radially extending tie down tabs 264 coextensively extends from a different one of the plurality of radially extending reinforcement ribs 254.

The transparent skirt 240 further comprises a radially extending tie down tab 266 coextensively extending from the lowermost circular reinforcement edge 250 proximate the first reinforced terminal end 244 of said skirt 240 and a radially extending tie down tab 268 coextensively extending from the lowermost circular reinforcement edge 250 proximate the second reinforced terminal end 246 of the skirt 240.

The transparent skirt 240 further comprises a plurality of interior tie down loops 270 wherein a different pair of the plurality of interior tie down loops 270 are spaced apart and interiorly attached to each different one of the plurality of radially extending reinforcement ribs 254 (FIG. 21) respectively.

Tie Down Assembly 272

Figure 26:
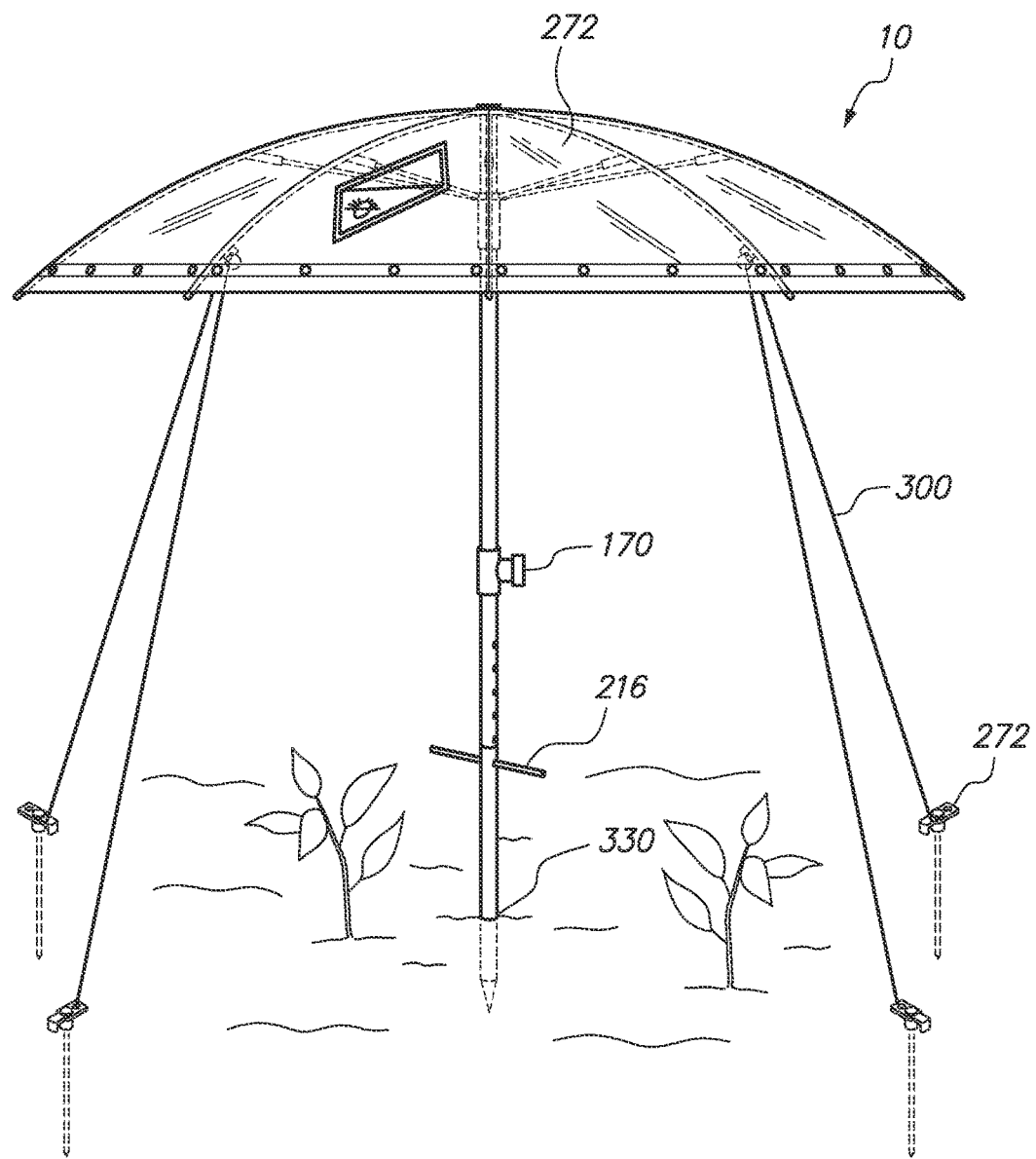
FIG. 26 is a perspective view of an embodiment of the collapsible portable plant dome device operatively coupled to the medial extension member received within the spike member driven into the ground wherein the medial extension is telescopically adjusted and pined to a stationary position relative to the spike member and, further illustrating, the operative coupling between tie down assemblies and interior tie down ring assemblies.

Referring to FIGS. 4 and 26, and as noted above, an embodiment of the collapsible plant dome device 10 further comprises the tie down assembly 272 utilized for anchoring the collapsible frame assembly 60 carrying the transparent vented canopy 120 to the ground or surface below when used in combination with one of the interior tie down rings 118 disposed on the collapsible frame 60 interior to the transparent vented canopy 120 and a cord 300 tethered therebetween.

Figures 24, 25:
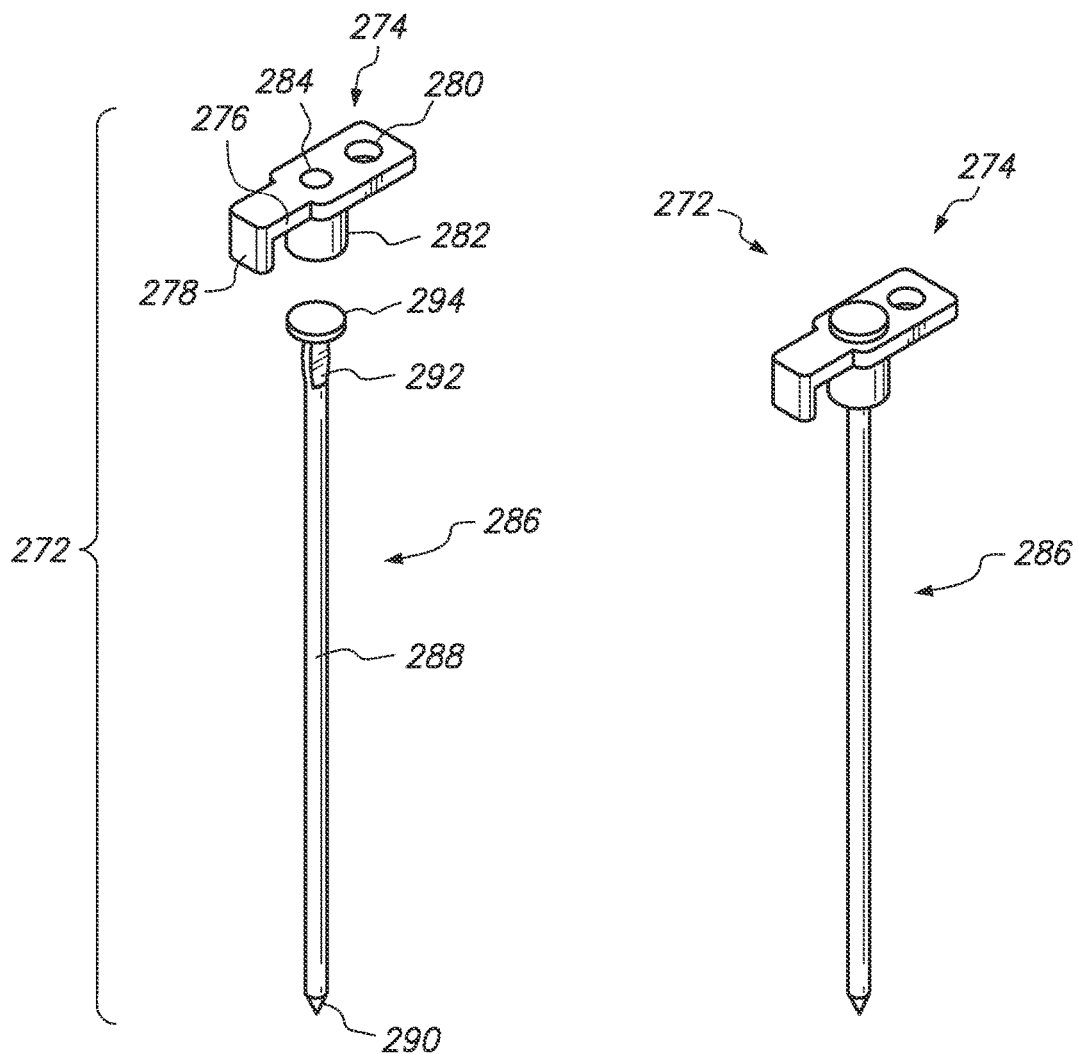
FIG. 24 is a side and top perspective view of a tie down assembly of an embodiment of the collapsible portable plant dome device comprising a tie down head and a tie down rod.
FIG. 25 is a side and top perspective view of the tie down head operatively coupled to tie down rod.

Referring now to FIG. 24, and in one embodiment, the tie down assembly 272 comprises a tie down head 274 comprised of a lateral projection 276 with a posterior downwardly extending resisting arm 278, an anteriorly located anchor hole 280, and a medially disposed downwardly extending neck 282 having an aperture 284 extending therethrough.

Tie down assembly 272 further comprises a tie down rod 286 comprised of a cylindrical rod 288 extending between an inferior conically shaped tip 290 and a superior flattened neck 292 surmounted by a disk-shaped head 294. In one embodiment, the diameter of the flattened neck 292 is greater than the diameter of the cylindrical rod 288 and the conically shaped tip 290.

Referring to FIGS. 24 and 25, the aperture 284 in the neck 282 is configured to allow passage of the inferior conically shaped tip 290 and the cylindrical rod 288 while frictionally fitting with the protruding sides of the flattened neck 292 when the underside of the disk-shaped head 294 is in abutment with a top surface of the tie down head 274 as illustrated in FIG. 25.

Furthermore, the extending resisting arm 278 affords a bearing for the tie down rod assembly 272 for receiving and resisting strain of the tie down rope or cord 300 and preventing the tie down assembly 272 from being pulled or torn from the ground. The resisting arm 278 is especially effective when the collapsible plant dome device 10 is pitched upon sandy or moist ground.

Central Telescopic Support Member

Referring to FIG. 27, and in an alternate embodiment, a central telescopic support member 310 replaces medial extension member 160 a spike member 330 replaces spike member assembly 200.

More specifically, and referring to FIG. 29, the telescopic support member 310 comprises a first tubular member 312 slideably engaged within a second tubular member 322. The first tubular member 312 comprises an open superior end 314, an open inferior end 316, an aperture 318, and a spring protrusion 320 similar to spring protrusion 58. In turn, the second tubular member 322 comprises an open superior end 324, an open inferior end 326 configured to receive spike member 330, and a series of apertures 328 disposed within the second tubular member between the open superior end 324 and open inferior end 326 for receiving the spring protrusion 320 for adjustably lowering and raising the height of the collapsible frame assembly 60 supporting the transparent vented canopy 120 thereon.

The spike member 330 comprises a shank portion 332 sized to be received within the open inferior end 326 of the second tubular member 322 wherein the shank portion 332 comprises a spring protrusion 334 similar to spring protrusion 58. The shank portion 332 terminates to a radially extending circumscribing collar 336 which, in turn, transitions into a body 338 that terminates into conical tip 340 that assists with the insertion of the spike member 330 into the ground or soil below the transparent vented canopy 120

In Use and Operation

In use and operation, and referring to the drawings, the user initially locates and drives the spike member 202 into the ground or soil and couples the central support member 20 thereto as detailed above and illustrated. Then, the collapsible frame assembly 60 is operatively coupled to the central support member 20 for supporting the transparent vented canopy 120 relative to a surface below as detailed above and illustrated in FIG. 26. As illustrated FIG. 4, the transparent skirt 240 is interiorly coupled to the transparent vented canopy 120 to provide a conically shaped sidewall downwardly depending from the transparent vented canopy 120 for enclosing plants therein.

In an alternative embodiment, the central telescopic support member 310 and spike member 330 respectively replace the medial extension member 160 and spike member assembly 200. In another alternative embodiment, a light-impervious canopy and/or a light-impervious skirt respectively replaces the transparent vented canopy 120 and/or transparent skirt 240 for providing shade or darkness to plants therein to achieve particular results, botanical or otherwise. As another alternative, the transparent vented canopy 120 and/or the transparent skirt 240 may be formed from a combination of transparent and light-imperious materials.

The above delineation of the central plant dome device 10, including its methods and aspects demonstrate the industrial applicability of this invention.

Moreover, it should be apparent that numerous modifications and adaptations may be resorted to without departing from the scope and fair meaning of this invention as set forth hereinabove and as described herein below by the claims.

I claim:

1. A collapsible plant dome device, said device comprising:
   a central support member comprising a cylindrical sidewall axially extending between a superior end and an inferior end;
   a transparent canopy formed of a transparent material enabling sunlight to pass therethrough;
   a collapsible frame assembly mounted on said central support member proximate said superior end; said collapsible frame assembly comprising a first plurality of support arms carrying said transparent canopy;
   a pair of diametrically opposed triangular shaped vent mesh openings disposed within a sidewall of said transparent canopy, said triangular shaped vent mesh openings each having a horizontal upper edge and side edges converging to a lower tip;
   a pair of diametrically opposed triangular shaped vent flaps each comprising an interior surface, an exterior surface, and a horizontal edge transitioning to side edges converging to a tip wherein said horizontal edge of each of said triangular shaped vent flaps is pivotally connected to a respective horizontal upper edge of each of said diametrically opposed triangular shaped vent mesh openings for covering each of said diametrically opposed triangular shaped vent mesh openings in a closed configuration and uncovering each of said diametrically opposed triangular shaped vent mesh openings in an open configuration; and
   means for fastening each of said diametrically opposed triangular shaped vent flaps in said closed and open configurations.

2. The device of claim 1 wherein said transparent canopy comprises a lower reinforced circumscribing strip having an array of spaced apart first snap button portions disposed along an entire length of said lower reinforced circumscribing strip wherein each of said spaced apart first snap button portions comprises a snap button receiving end disposed on an interior of said lower reinforced circumscribing strip.

3. The device of claim 2 further comprising a transparent skirt, said transparent skirt comprising:
   a body formed of a transparent material enabling sunlight to pass therethrough, said body having an uppermost circular reinforcement edge and a lowermost circular edge of greater diameter than a diameter of said uppermost circular reinforcement edge;
   a circular array of spaced apart second snap button portions each with a protrusion end disposed on an exterior of said uppermost circular reinforcement edge of said skirt for providing an overlapping coupling of said receiving ends of said array of said first snap button portions with said protrusion ends of said circular array of spaced apart second snap button portions for forming an imbricated coupling with said transparent canopy overlapping said transparent skirt.

4. The device of claim 3 wherein said transparent skirt further comprises:
   a first terminal end and a second terminal end;
   an array of spaced apart third snap button portions each with a receiving end disposed on an interior of said first terminal end of said transparent skirt; and
   an array of spaced apart fourth snap button portions each with a protrusion end disposed on an exterior of said second terminal end of said skirt for providing an overlapping coupling of said receiving ends of said array of said third snap button portions with said protrusion ends of said array of said fourth snap button portions.

5. The device of claim 4 wherein said body of said skirt further comprises:
   a series of eight trapezoidal shaped sectors extending between said first and second terminal ends of said transparent skirt, each of said trapezoidal shaped sectors having an upper arcuate edge, a lower arcuate edge, and a pair of terminating sides;
   a plurality of radially extending reinforcement ribs, a different one of said plurality of radially extending reinforcement ribs disposed at each intersection between terminating sides of adjacent trapezoidal shaped sectors in said series of eight trapezoidal shaped sectors wherein adjacent terminating sides of adjacent trapezoidal shaped sectors comprises one of said plurality of radially extending reinforcement ribs.

6. The device of claim 5 further comprising a plurality of radially extending tie down tabs, a different one of said plurality of radially extending tie down tabs coextensively extending from a different one of said plurality of radially extending reinforcement ribs, each of said plurality of radially extending tie down tabs comprising an anchor eyelet.

7. The device of claim 6 further comprising a plurality of interior tie down loops wherein a different one of said plurality of interior tie down loops is interiorly attached to each one of said plurality of radially extending reinforcement ribs.

8. The device of claim 7 further comprising a first radially extending tie down tab coextensively extending from the lowermost circular reinforcement edge proximate said first terminal end of said transparent skirt and a second radially extending tie down tab coextensively extending from the lowermost circular reinforcement edge proximate said second terminal end of said transparent skirt.

9. The device of claim 8 wherein said canopy comprises eight sectors having radially extending nylon stitch reinforcement strips between adjacent sectors.

10. The device of claim 9 wherein each of said pair of diametrically opposed triangular shaped vent flaps comprises said exterior surface having indicia disposed thereon.

11. A collapsible plant dome device, said device comprising:
   a central support member comprising a cylindrical sidewall axially extending between a superior end and an inferior end;
   a transparent canopy formed of a transparent material enabling sunlight to pass therethrough;
   a collapsible frame assembly mounted on said central support member proximate said superior end;
   said collapsible frame assembly comprising a first plurality of support arms carrying said transparent canopy;
   a pair of diametrically opposed triangular shaped vent mesh openings disposed within a sidewall of said transparent canopy, said triangular shaped vent mesh openings each having a horizontal upper edge and side edges converging to a lower tip;

a pair of diametrically opposed triangular shaped vent flaps each comprising an interior surface, an exterior surface, and a horizontal edge transitioning to side edges converging to a tip wherein said horizontal edge of each of said triangular shaped vent flaps is pivotally connected to a respective horizontal upper edge of each of said diametrically opposed triangular shaped vent mesh openings for covering each of said diametrically opposed triangular shaped vent mesh openings in a closed configuration and uncovering each of said diametrically opposed triangular shaped vent mesh openings in an open configuration;

means for fastening each of said diametrically opposed triangular shaped vent flaps in said closed and open configurations; and a first pair of tie down rings each interiorly mounted on a different one of a diametrically opposed pair of said first plurality of support arms carrying said transparent canopy.

12. The device of claim 11 further comprising a second pair of tie down rings each interiorly mounted on a different one of a second diametrically opposed pair of said first plurality of support arms carrying said canopy wherein an axis between said second diametrically opposed pair of tie down rings is generally perpendicular to an axis between said first diametrically opposed pair of tie down rings.

13. The device of claim 12 wherein each of said first and second pair of tie down rings is mounted on said respective one of said first plurality of support arms carrying said canopy by way of a fitting, each said fitting comprising:

an elongated body wrapped about said respective one of said first plurality of support arms; and a pair of substantially flat lugs extending from mutually opposite sides of said elongated body radially inwardly in substantially parallel relationship toward said central longitudinal axis of said support member wherein said flat lugs have opposed openings having a common axis through said flat lugs so that said respective tie down ring can be received through and pivot about said common axis of said openings.

14. The device of claim 13 further comprising a medial extension member comprising a superiorly disposed clamping collar means for operatively coupling said inferior end of said central support member to said superiorly disposed clamping collar means of said medial extension member for extending the height of said transparent canopy relative to a surface below.

15. The device of claim 14 further comprising a spike member operatively coupled to an inferior end of said medial extension member, said spike member comprising an inferior pointed end.

16. The device of claim 15 further comprising a tie down assembly comprising:

a tie down head comprised of a lateral projection with a posterior downwardly extending resisting arm, an anteriorly located anchor hole, and a medially disposed downwardly extending neck having an aperture extending therethrough;

a tie down rod comprising a cylindrical rod extending between an inferior conically shaped tip and a superior flattened neck surmounted by a disk-shaped head wherein a diameter of said flattened neck is greater than a diameter of said cylindrical rod and conically shaped tip; and wherein said aperture in said neck is configured to allow passage of said inferior conically shaped tip and said cylindrical rod while frictionally fitting with said protruding sides of said flattened neck when said disk-shaped head is in abutment with a top surface of said tie down head; and wherein said extending resisting arm affords a bearing for the tie down rod for receiving and resisting strain of a tie down rope attached to at least one of said tie down rings and preventing the tie down assembly being pulled or torn from the ground.

17. A collapsible plant dome device, said device comprising:

a central support member comprising a cylindrical sidewall axially extending between a superior end and an inferior end;

a transparent canopy formed of a transparent material enabling sunlight to pass therethrough;

a collapsible frame assembly mounted on said central support member proximate said superior end;

said collapsible frame assembly comprising a first plurality of support arms carrying said transparent canopy;

a pair of diametrically opposed triangular shaped vent mesh openings disposed within a sidewall of said transparent canopy, said triangular shaped vent mesh openings each having a horizontal upper edge and side edges converging to a lower tip;

a pair of diametrically opposed triangular shaped vent flaps each comprising an interior surface, an exterior surface, and a horizontal edge transitioning to side edges converging to a tip wherein said horizontal edge of each of said triangular shaped vent flaps is pivotally connected to a respective horizontal upper edge of each of said diametrically opposed triangular shaped vent mesh openings for covering each of said diametrically opposed triangular shaped vent mesh openings in a closed configuration and uncovering each of said diametrically opposed triangular shaped vent mesh openings in an open configuration;

means for fastening each of said diametrically opposed triangular shaped vent flaps in said closed and open configurations; and a first pair of tie down rings each interiorly mounted on a different one of a diametrically opposed pair of said first plurality of support arms carrying said transparent canopy; and a second pair of tie down rings each interiorly mounted on a different one of a second diametrically opposed pair of said first plurality of support arms carrying said canopy wherein an axis between said second diametrically opposed pair of tie down rings is generally perpendicular to an axis between said first diametrically opposed pair of tie down rings.

18. The device of claim 17 further comprising a transparent skirt formed of a transparent material enabling sunlight to pass therethrough, said transparent skirt having an uppermost circular edge and a lowermost circular edge of greater diameter than a diameter of said uppermost circular edge.

19. The device of claim 18 further comprising means for detachable coupling said uppermost circular edge of said transparent skirt to a lower circumscribing edge of said transparent canopy for forming an imbricated coupling with said transparent canopy overlapping said transparent skirt.

20. The device of claim 19 further comprising a tie down assembly comprising:

a tie down head comprised of a lateral projection with a posterior downwardly extending resisting arm, an anteriorly located anchor hole, and a medially disposed downwardly extending neck having an aperture extending therethrough;

a tie down rod comprising a cylindrical rod extending between an inferior conically shaped tip and a superior flattened neck surmounted by a disk-shaped head wherein a diameter of said flattened neck is greater than a diameter of said cylindrical rod and conically shaped tip; and wherein said aperture in said neck is configured to allow passage of said inferior conically shaped tip and said cylindrical rod while frictionally fitting with said protruding sides of said flattened neck when said disk-shaped head is in abutment with a top surface of said tie down head; and wherein said extending resisting arm affords a bearing for the tie down rod for receiving and resisting strain of a tie down rope attached to at least one of said tie down rings and preventing the tie down assembly being pulled or torn from the ground.

* * * * *